(12) United States Patent
Fevre et al.

(10) Patent No.: US 8,448,986 B2
(45) Date of Patent: May 28, 2013

(54) DEVICE FOR ADJUSTING A STEERING COLUMN

(75) Inventors: Laurent Fevre, Saint-Sulpice (FR); Eddy Dupont, Vendome (FR); Alexandre Sarandao, Monnaie (FR)

(73) Assignee: ZF Systemes de Direction Nacam SAS, Vendome (FR)

( * ) Notice: Subject to any disclaimer, the term of this patent is extended or adjusted under 35 U.S.C. 154(b) by 177 days.

(21) Appl. No.: 12/951,295

(22) Filed: Nov. 22, 2010

(65) Prior Publication Data

US 2011/0121552 A1 May 26, 2011

(30) Foreign Application Priority Data

Nov. 25, 2009 (FR) ...................................... 09 05665

(51) Int. Cl.
*B62D 1/181* (2006.01)
*B62D 1/187* (2006.01)
*B62D 1/18* (2006.01)

(52) U.S. Cl.
USPC .............. 280/775; 280/777; 280/779; 74/493

(58) Field of Classification Search
USPC ...................... 280/775, 777, 779, 780; 74/493
See application file for complete search history.

(56) References Cited

U.S. PATENT DOCUMENTS

| 3,822,608 | A | * | 7/1974 | Murase et al. | 74/493 |
| 4,703,669 | A | * | 11/1987 | Hyodo | 74/492 |
| 4,739,673 | A | * | 4/1988 | Ishikawa et al. | 74/493 |
| 5,035,446 | A | * | 7/1991 | Arvidsson | 280/775 |
| 5,690,363 | A | * | 11/1997 | Rybinski | 280/779 |
| 5,848,557 | A | * | 12/1998 | Sugiki et al. | 74/493 |
| 6,640,661 | B2 | * | 11/2003 | Duncan et al. | 74/493 |
| 7,159,904 | B2 | * | 1/2007 | Schafer et al. | 280/775 |
| 7,226,082 | B2 | * | 6/2007 | Muramatsu et al. | 280/775 |
| 2004/0144192 | A1 | * | 7/2004 | Tomaru et al. | 74/492 |
| 2004/0194570 | A1 | * | 10/2004 | Tomaru et al. | 74/495 |

FOREIGN PATENT DOCUMENTS

WO 2004067356 A1 8/2004

* cited by examiner

*Primary Examiner* — Paul N Dickson
*Assistant Examiner* — George Spisich
(74) *Attorney, Agent, or Firm* — Bachman & LaPointe, P.C.

(57) ABSTRACT

A device for adjusting a steering column includes a body and a cap assembled by a pivot and a connection element enabling the displacement of the body with respect to the cap under the action of a motor-reduction unit mounted on the body. The device is characterized in that the connection element includes at least one arm of which a first end is attached to the cap and a second end is connected to a threaded rod with vertical displacement cooperating in rotation with the drive shaft of a motor-reduction unit so that the arm forms a hinge enabling the reversible angular displacement of the body with respect to the cap.

15 Claims, 7 Drawing Sheets

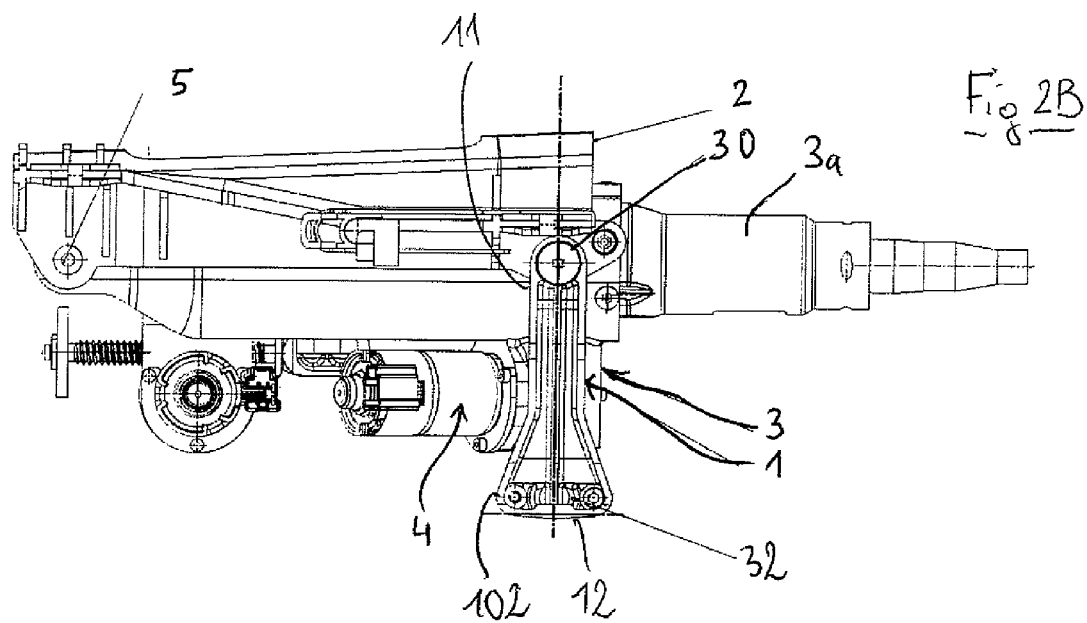
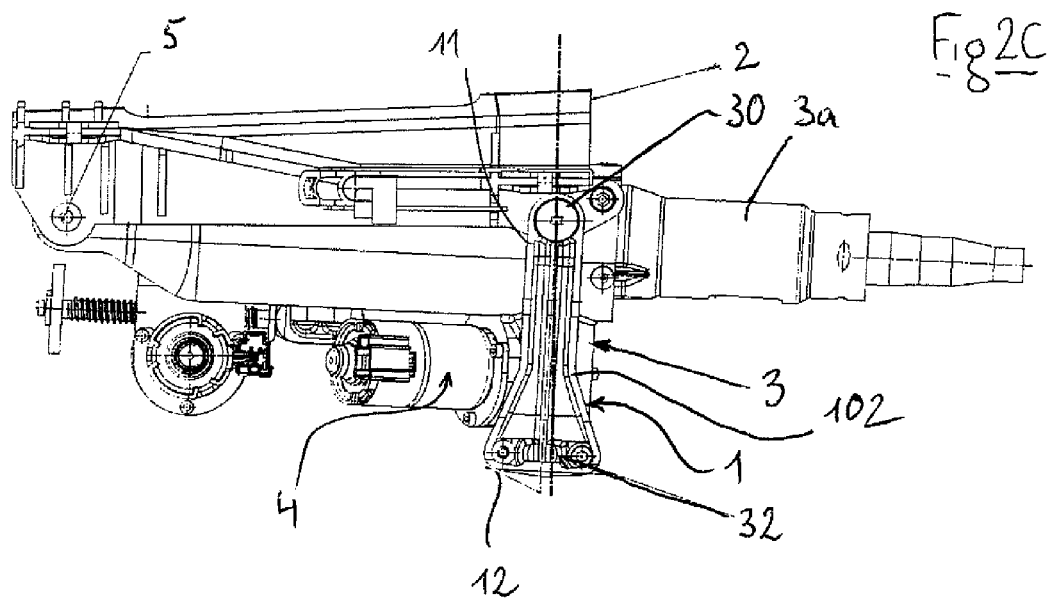

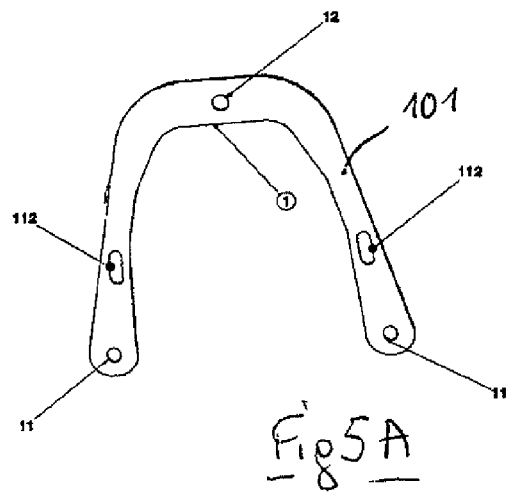
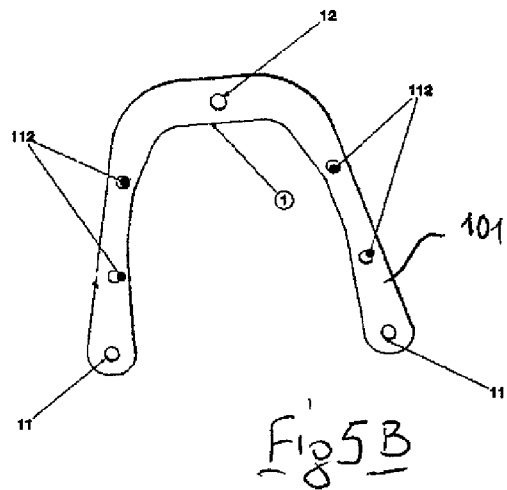
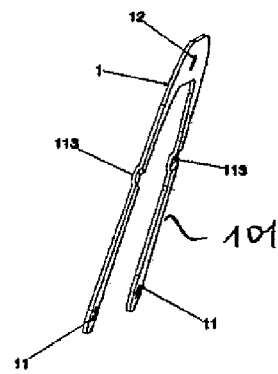
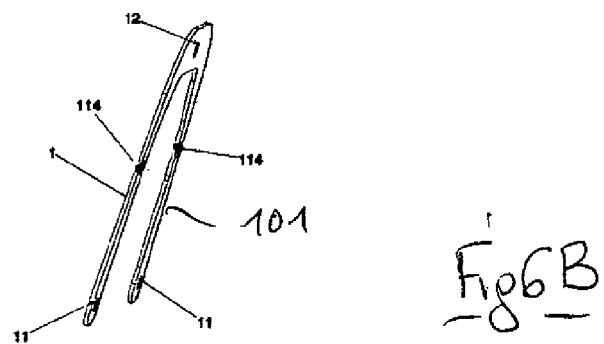

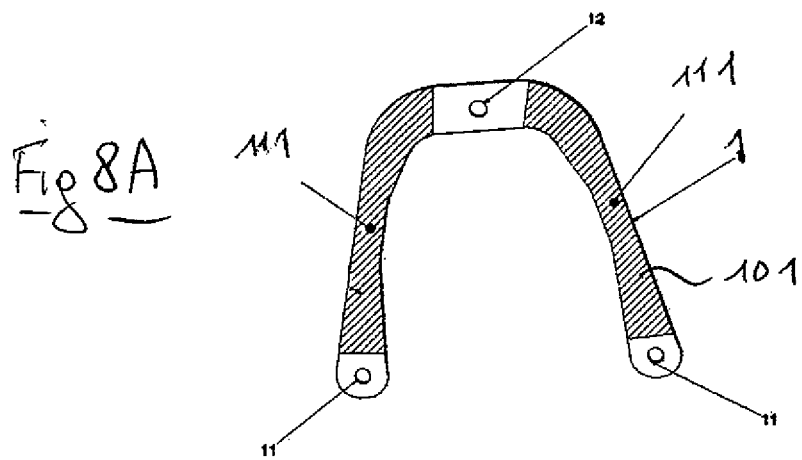
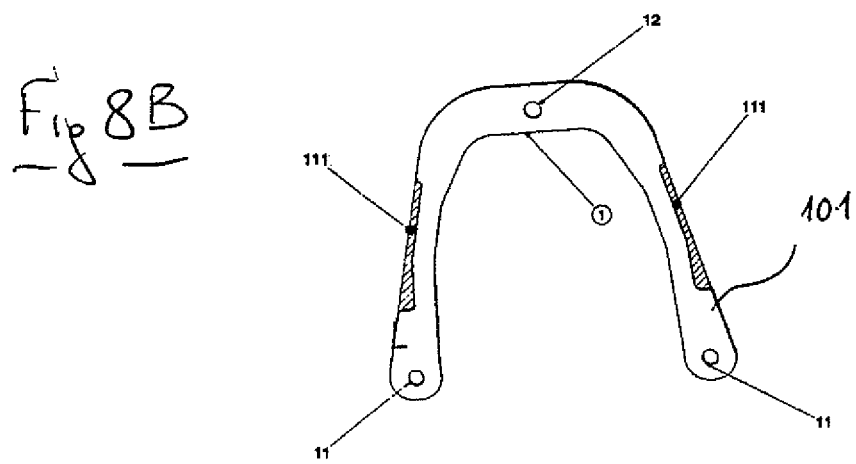

DEVICE FOR ADJUSTING A STEERING COLUMN

BACKGROUND

This invention relates to a device intended to adjust a steering column.

Steering columns of motor vehicles generally include a column body and a cap mounted on top of the body as well as a connection element intended to ensure the assembly thereof while enabling the angular displacement of the body with respect to the cap.

The adjustment of the angular position of the column is performed by means of a motor-reduction unit mounted on the body and associated with an electronic control system capable of being actuated by the driver of the vehicle in order to optimize the position of the steering wheel and the driving comfort.

The existing adjustment devices include, with respect to the position of the steering wheel, a distal pivot and a proximal connection element of which the ends are connected to the cap and to the body via, respectively, a rotation pin and a motor-reducer unit coupled to a sliding shoe.

However, the search for approximately 5 degrees of rotational freedom of the body with respect to the cap requires the coupling of a plurality of assembly elements and, in particular, guide rails that produce excess weight on the column and that generate friction at the connections.

These constraints determine the choice of parts, the profile thereof and the sizes thereof as well as the materials used.

In addition, their assembly requires relative clearances capable of accelerating wear and creating detrimental shifts in the direction of the column and therefore the position of the steering wheel mounted on the end projecting from the body of the column.

SUMMARY OF THE INVENTION

This invention is intended to solve the technical problems mentioned above by simplifying the column adjustment device.

This objective is achieved, according to the invention, by means of a device in which said connection element includes at least one arm of which a first end is attached to the cap and a second end is attached to the motor-reducer unit according to transverse pins so that said arm forms a hinge enabling the reversible angular displacement of the body with respect to the cap.

According to an advantageous feature, the attachment of at least one of the ends of the arm is ensured via a transverse pin enabling the rotation.

According to a preferred embodiment, said arm is at least partially resiliently deformable.

According to another embodiment, said arm has selective deformation areas.

According to another advantageous alternative to these embodiments the selective deformation areas consist of arched segments and/or toe-ins provided on the arm.

According to another alternative, the selective deformation areas consist of holes formed on the arm.

According to yet another alternative, the selective deformation areas consist of arm segments of reduced width and/or thickness.

According to another feature, said arm is equipped with stiffening elements defining non-deformable areas and forming selective deformation areas therebetween.

According to another feature, the second end of the arm is connected to a threaded rod secured to one of the transverse attachment pins and cooperating with the motor-reduction unit.

According to yet another feature, said arm comprises at least one branch formed by a metal blade.

According to another alternative, said connection element comprises two symmetrical branches forming a U-shaped element.

According to yet another alternative, said connection element includes intermediate connections that are resiliently deformable by compression, which are attached respectively between the ends of the arm and the body and/or the cap.

The device of the invention makes it possible to obtain the degrees of freedom by pivoting the body with respect to the cap by means of rotation pins and/or the deformation capacity of the connection elements, without the need to use shoes at the attachment points.

Consequently, the total weight of the steering system is reduced and the friction noise generated by the sliding of the shoes in the previous systems when adjusting the position of the column is eliminated.

BRIEF DESCRIPTION OF THE DRAWINGS

The invention can be better understood in view of the following description, in reference to the appended drawings, in which:

FIGS. 2A, 2B and 2C show side views of the adjustment device of FIG. 1 in high, intermediate and low positions, respectively, of the column body.

FIGS. 5A and 5B, 6A and 6B, 7A, 7B, 7C and 7D, 8A and 8B show frontal or perspective detail views of alternative embodiments of the connection element of the second embodiment of the device of the invention.

DETAILED DESCRIPTION OF THE PREFERRED EMBODIMENT(S)

Figure 1A:
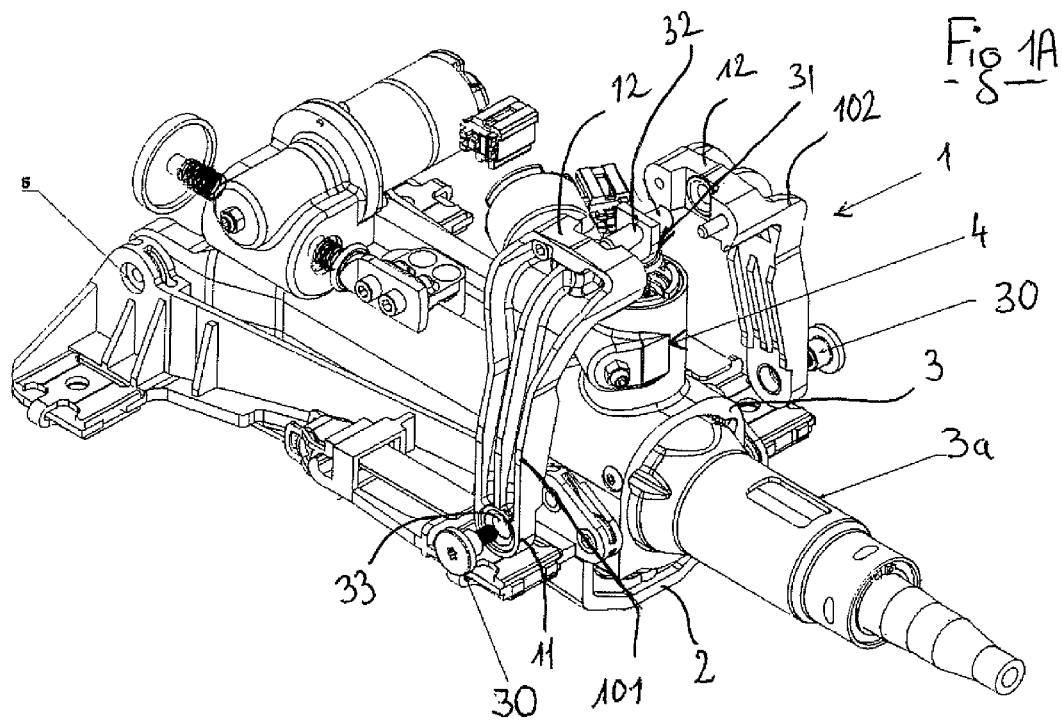
FIG. 1A shows a partially exploded perspective view of a first embodiment of the adjustment device of the invention in the reverse position.
Figure 2A:
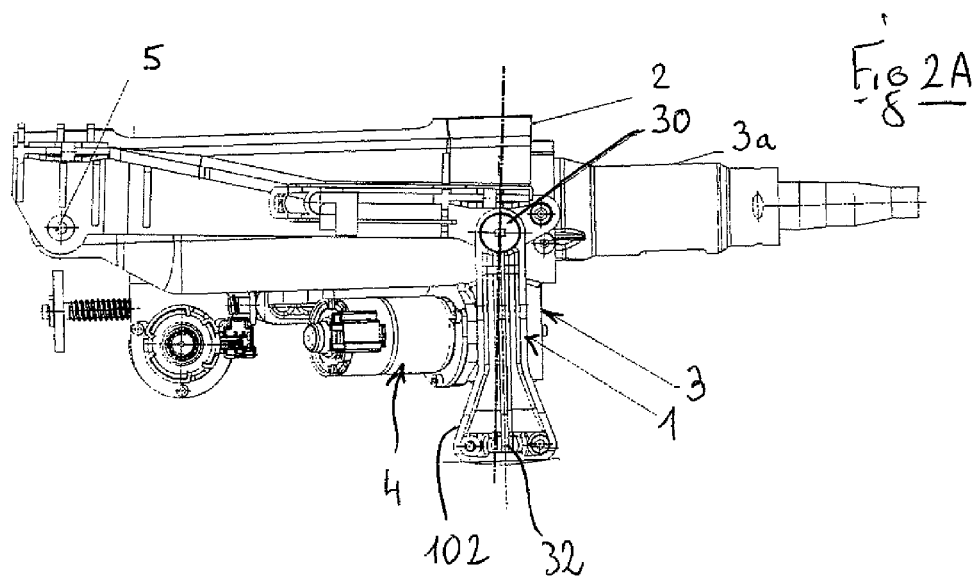
Figure 3:
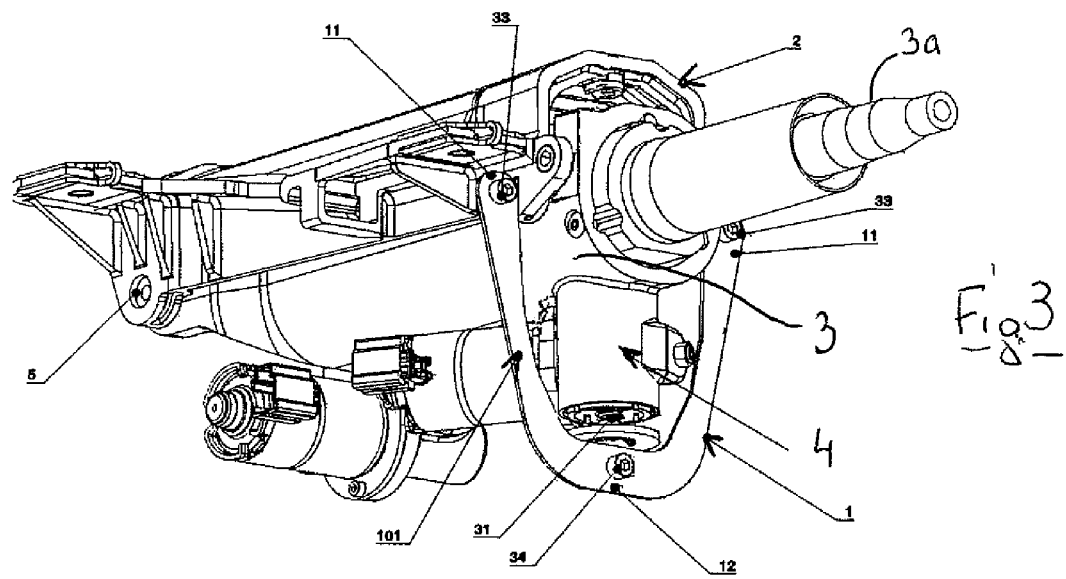
FIG. 3 shows a perspective view of a second embodiment of the adjustment device of the invention.

The adjustment device shown, in particular in FIGS. 1A and 3, is intended for a motor vehicle steering column system.

This system includes a body 3 supporting a column 3a to be mounted at the end by a steering wheel (not shown) and a cap 2 attached, directly or indirectly, to the vehicle chassis frame.

The body 3 and the cap 2 are assembled by means of a distal pivot 5 and a connection element 1 enabling the angular displacement of the body 3 with respect to the cap 2 under the action of a motor-reduction unit 4 mounted on said body.

The motor-reduction unit is capable of being actuated by the driver of the vehicle via an electric control (not shown).

In the embodiment of FIGS. 1A, 1B, 1C, 2A and 2B, the connection element 1 consists of two arms 101, 102 assembled at their lower ends 12 by being connected to a threaded rod 31 borne by the motor-reduction unit 4.

The attachment of the arms 101, 102, respectively, on the cap 2 and the body 3 is performed according to transverse pins so that the arm forms a hinge enabling the reversible angular displacement of the body with respect to the cap.

Figure 1B:
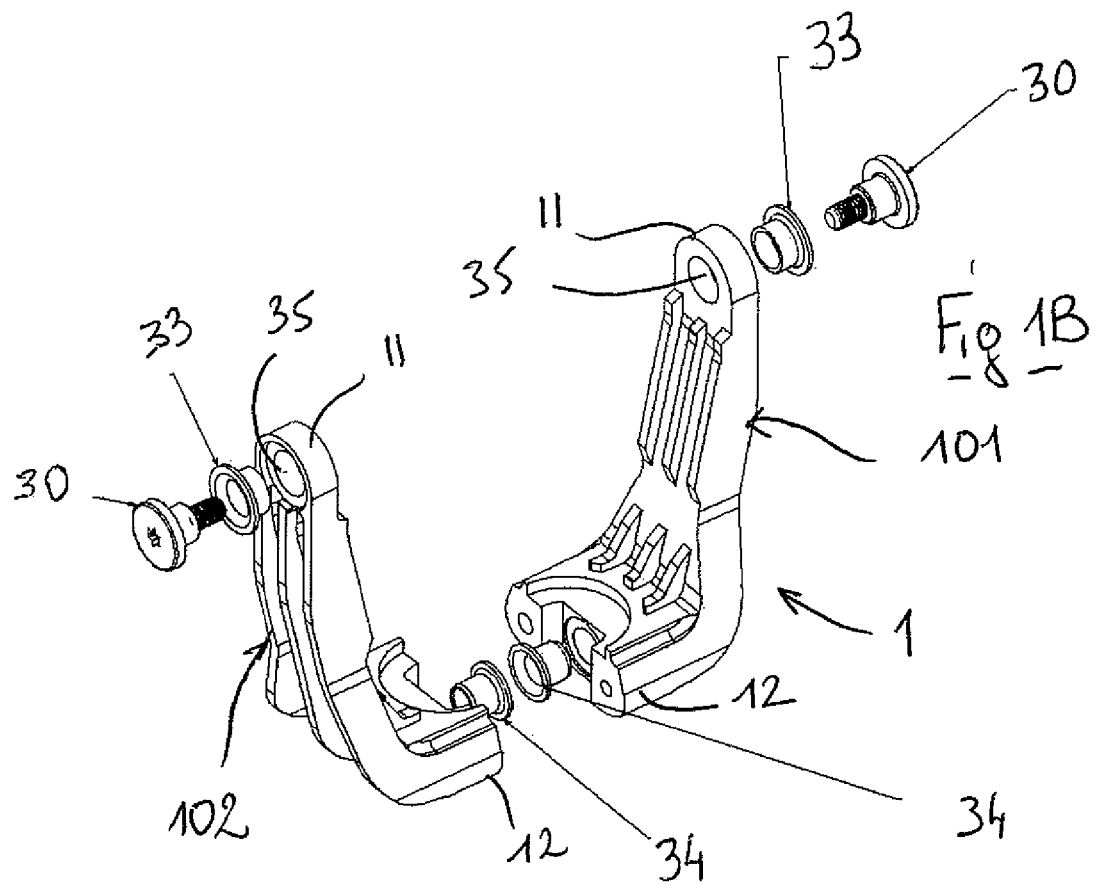
FIGS. 1B and 1C show detail views of the device of FIG. 1A.
Figure 1C:
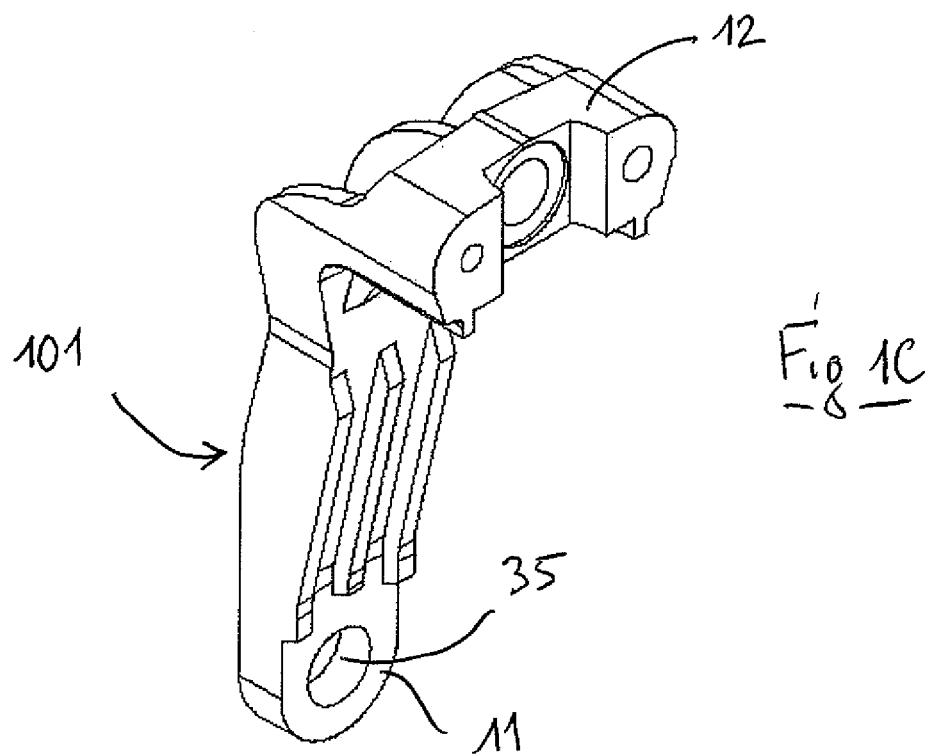

In FIGS. 1A, 1B, 1C and 2A, 2B, the transverse pins for attachment with the body 3 are constituted by screws or studs 30 housed in transverse bore holes 35 and associated with bearings 33 (see FIG. 1B).

The attachment of at least one of the ends 11, 12 of the arms 101, 102 is ensured via a transverse pin also enabling the rotation of the connection element 1.

In FIG. 1A, the upper end 11 of each of the arms ensures the attachment with the cap 2 and provides several degrees of rotational freedom.

The second end 12 is intended for attachment with the body 3 and is connected, for this purpose, to the rod 31 of the motor-reduction unit 4 via a proximal pivot 32 associated with bearings 34 (see FIG. 1B) also allowing a rotation by several degrees.

It would be possible, according to an alternative not shown, to mount the motor-reduction unit 4 on the cap 2 instead of the body 3.

Under the combined action of the vertically displaceable rod 31, the axes of the screws 30 and the pivots 32 cooperating with bearings, the connection element 1 acts as a swivel joint with respect to the cap 2 and the body 3 and enables the upward or downward displacement of the column 3a and the steering wheel with respect to the cap.

In the embodiment of FIG. 3 and following, the connection element 1 is at least partially resiliently deformable and includes an arm forming a one-piece connection element with two U-shaped branches of which the first respective ends 11 are secured to the cap 2 while a second end 12, common to the two branches, is secured to the motor-reduction unit 4.

The second end 12 is connected to a threaded rod 31 or an endless screw cooperating in rotation with the drive shaft of the motor-reduction unit 4.

The arm 101 comprises at least one branch formed by a metal blade of low thickness having enough flexibility to absorb, by resilient deformation, the reversible angular displacements of the body 3 with respect to the cap 2.

Under these conditions, it is not necessary to provide pivots and bearings at the attachment points of the ends 11, 12 of the connection element 1 on the cap and the body, which can be rigid.

Figure 4A:
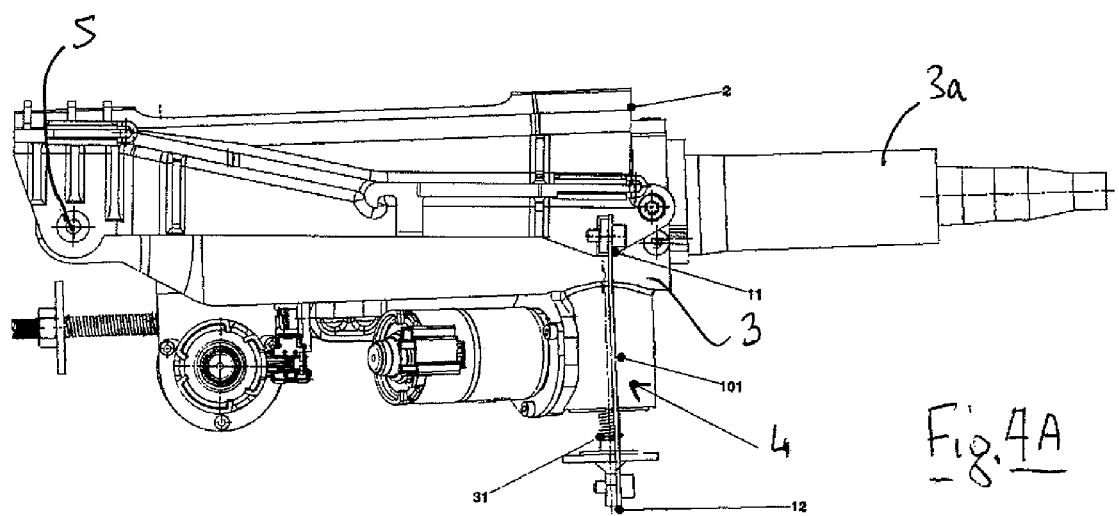
FIGS. 4A and 4B show side views of the adjustment device of FIG. 3 in high, intermediate and low positions, respectively, of the column body.
Figure 4B:
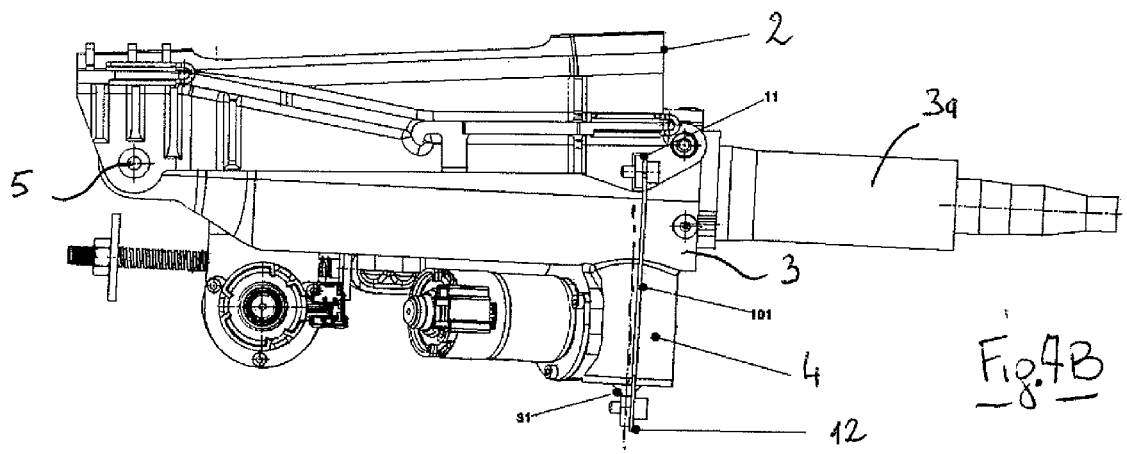
Figure 7A:
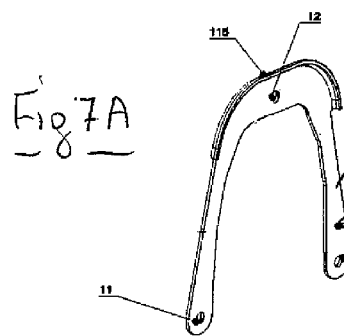
Figure 7B:
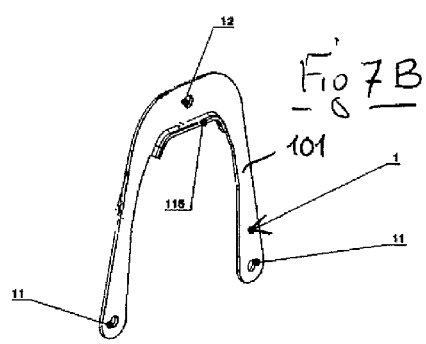
Figure 7C:
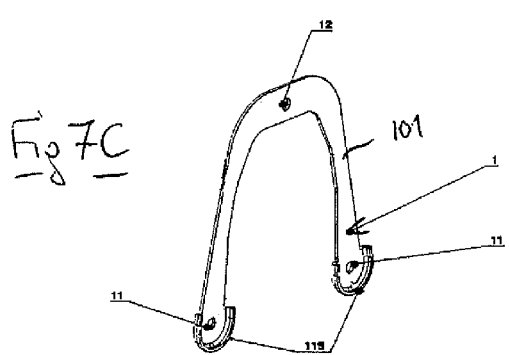
Figure 7D:
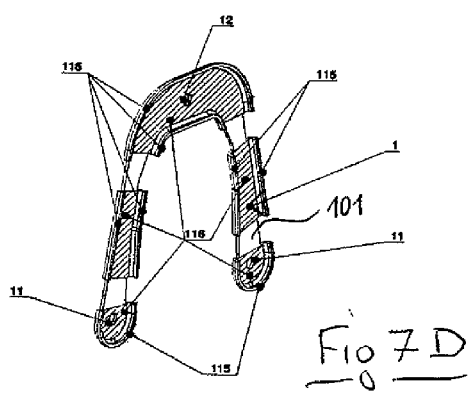

FIGS. 4A and 4B show the body 3 in the high and low positions, respectively.

In FIG. 4A, the arm 101 is bent toward the front of the vehicle while, in FIG. 4B, it is bent toward the rear.

In the alternative of FIGS. 5A and 5B, the arm 101 has selective deformation areas formed by holes 112.

In the alternative of FIGS. 6A and 6B, the selective deformation areas consist of arched segments 113 or toe-ins 114.

In the alternative of FIGS. 8A and 8B, the selective deformation areas consist of segments 111, 112 with a reduced width and/or thickness with respect to the other segments of the arm.

In the alternatives of FIGS. 7A to 7D, the arms are equipped with stiffening elements defining non-deformable areas and having selective deformation areas therebetween.

The stiffening elements include peripheral rods 115 mounted on the edge of the arms and surrounding, as the case may be, thinned segments 116 (FIG. 5D).

Of course, it is also possible according to the invention to combine all or some of the alternatives shown in the figures.

The deformation capacity and flexibility can be further increased by providing, in a complementary manner, intermediate connections, made of a material that is resiliently deformable by compression, between the ends of the arms and the body 3 and/or the cap 2, respectively.

The arm can be made of metal or any other material having the mechanical properties required to effectively ensure the technical function described, such as plastic or composite materials.

The invention claimed is:

1. Device for adjusting a steering column including a body and a cap assembled by means of a pivot and a connection element enabling the displacement of the body with respect to the cap under the action of a motor-reduction unit mounted on said body, said connection element including at least one arm of which a first end is attached to the cap and a second end is fixed to a threaded rod with vertical displacement cooperating in rotation with a drive shaft of the motor-reduction unit so that said at least one arm forms a hinge enabling reversible angular displacement of the body with respect to the cap, the second end of the at least one arm being displaced in regard to the cap under the effect of the motor-reduction unit.

2. Adjustment device according to claim 1, wherein the attachment of at least one of the ends of the at least one arm is ensured via a transverse pin enabling the rotation.

3. Adjustment device according to claim 1, wherein said at least one arm is at least partially resiliently deformable.

4. Adjustment device according to claim 3, wherein said at least one arm has selective deformation areas.

5. Adjustment device according to claim 4, wherein the selective deformation areas consist of at least one of arched segments and toe-ins provided on the at least one arm.

6. Adjustment device according to claim 4, wherein the selective deformation areas consist of holes formed on the at least one arm.

7. Adjustment device according to claim 4, wherein the selective deformation areas consist of arm segments of reduced width and/or thickness.

8. Adjustment device according to claim 4, wherein said arm is equipped with stiffening elements defining non-deformable areas and forming selective deformation areas therebetween.

9. Adjustment device according to claim 1, wherein said at least one arm comprises at least one branch formed by a metal blade.

10. Adjustment device according to claim 1, wherein said connection element comprises two symmetrical branches forming a U-shaped element.

11. Adjustment device according to claim 1, wherein said connection element includes coupling elements that are resiliently deformable by compression, which are attached respectively between the ends of the arm and at least one of the body and the cap.

12. Adjustment device according to claim 1, wherein the connection element consists of two arms assembled at their lower ends by being connected to a threaded rod borne by the motor-reduction unit, the attachment of the arms, respectively, on the cap and the body is performed by transverse pins.

13. Adjustment device according to claim 12, wherein the transverse pins are constituted by screws or studs housed in transverse bore holes and associated with bearings, and the attachment of at least one of the ends of the arms is ensured via one of the transverse pins also enabling the rotation of the connection element.

14. Adjustment device according to claim 12, wherein an upper end of each of the arms ensures the attachment with the cap and provides several degrees of rotational freedom, and the second end is intended for attachment with the body and is connected to the rod of the motor-reduction unit via a proximal pivot associated with bearings.

15. Adjustment device according to claim 1, wherein the motor-reduction unit is fixed on a face of the body oppositely to the cap.

\* \* \* \* \*